(12) United States Patent
Comtois et al.

(10) Patent No.: US 12,337,511 B2
(45) Date of Patent: Jun. 24, 2025

(54) COMBUSTIBLE CONTAINERS MANUFACTURED USING REACTIVE INJECTION MOLDING OF AZIDO POLYMERS

(71) Applicant: General Dynamics Ordnance and Tactical Systems—Canada, Inc., Repentigny (CA)

(72) Inventors: Etienne Comtois, Montreal (CA); Charles Dubois, Brossard (CA); Pierre-Yves Paradis, Salaberry-de-Valleyfield (CA)

(73) Assignee: General Dynamics Ordnance and Tactical Systems—Canada Inc, Repentigny (CA)

( * ) Notice: Subject to any disclaimer, the term of this patent is extended or adjusted under 35 U.S.C. 154(b) by 0 days.

(21) Appl. No.: 18/513,097

(22) Filed: Nov. 17, 2023

(65) Prior Publication Data
US 2024/0083079 A1 Mar. 14, 2024

Related U.S. Application Data

(63) Continuation-in-part of application No. 17/449,059, filed on Sep. 27, 2021, now abandoned, and a
(Continued)

(51) Int. Cl.
*B29C 45/00* (2006.01)
*F42B 33/00* (2006.01)
(Continued)

(52) U.S. Cl.
CPC ........ *B29C 45/0001* (2013.01); *F42B 33/001* (2013.01); *B29K 2067/043* (2013.01);
(Continued)

(58) Field of Classification Search
CPC .. F42B 5/188; F42B 5/16; F42B 5/192; F42B 5/196; F42B 5/18; F42B 5/181;
(Continued)

(56) References Cited

U.S. PATENT DOCUMENTS

| | | |
|---|---|---|
| 3,159,701 A | 12/1964 | Herter |
| 3,218,907 A | 11/1965 | Beal et al. |

(Continued)

FOREIGN PATENT DOCUMENTS

| | | | | |
|---|---|---|---|---|
| AU | 2012302196 A1 | * | 2/2014 | ............. C06B 25/24 |
| CA | 1339576 C | * | 12/1997 | ........... C06B 45/105 |

(Continued)

*Primary Examiner* — John Cooper
(74) *Attorney, Agent, or Firm* — Lorenz & Kopf, LLP

(57) ABSTRACT

Small-, medium-, and large-caliber combustible cartridge cases and propellant combustible containers that are manufactured using reactive injection molding of azido polymers. An injection process for a single propellant combustible charge including the steps of: providing a quantity of azido bearing polymer; providing a quantity of curing agent; optionally providing a quantity of chemical blowing agent; optionally providing a quantity of fibers; optionally providing a quantity of additives and catalysts; and providing a mold defining a male cavity, a female cavity, and an injection port. The injection process further includes mixing together the azido bearing polymer, the curing agent, the optional chemical blowing agent, the optional fibers, the optional additives and catalysts, and injecting the resulting mixture into the mold.

20 Claims, 6 Drawing Sheets

Related U.S. Application Data continuation-in-part of application No. PCT/CA2022/051413, filed on Sep. 23, 2022.

(51) Int. Cl.
  *B29K 67/00* (2006.01)
  *B29K 105/00* (2006.01)

(52) U.S. Cl.
  CPC ............... *B29K 2105/0014* (2013.01); *B29K 2995/0088* (2013.01)

(58) Field of Classification Search
  CPC ...... F42B 5/182; F42B 5/184; C08G 18/7856; C08G 64/0241
  USPC ......................................................... 102/282
  See application file for complete search history.

(56) References Cited

U.S. PATENT DOCUMENTS

| | | | |
|---|---|---|---|
| 3,257,948 A * | 6/1966 | Axelrod | F42B 5/192 521/181 |
| 3,260,203 A | 7/1966 | Godfrey et al. | |
| 3,264,993 A | 8/1966 | De Fries et al. | |
| 3,280,746 A | 10/1966 | Brown | |
| 2,982,211 A | 5/1967 | Beal et al. | |
| 3,397,637 A | 8/1968 | Bobinski et al. | |
| 3,474,702 A | 10/1969 | Remaly et al. | |
| 3,504,630 A | 4/1970 | Picard | |
| 3,665,862 A * | 5/1972 | Lane | F42B 1/00 149/19.2 |
| 3,670,649 A | 6/1972 | Hartlein et al. | |
| 3,676,533 A | 7/1972 | Dehm et al. | |
| 3,688,697 A | 9/1972 | Paul et al. | |
| 3,706,280 A | 12/1972 | Bobinski et al. | |
| 3,927,616 A * | 12/1975 | Axelrod | C06B 45/10 102/431 |
| 3,977,325 A | 8/1976 | Jacobsen et al. | |
| 4,187,781 A | 2/1980 | Flanagan et al. | |
| 4,604,248 A * | 8/1986 | Dehm | C06B 21/0083 264/3.1 |
| 4,915,755 A * | 4/1990 | Kim | C06B 45/10 149/19.92 |
| 4,997,497 A * | 3/1991 | Wilson | C06B 45/105 149/19.6 |
| 5,237,927 A * | 8/1993 | Gonzalez | F42B 5/196 102/431 |
| 5,681,904 A * | 10/1997 | Manzara | C08G 65/332 525/410 |
| 6,872,266 B1 * | 3/2005 | Ciaramitaro | C08G 65/329 149/109.6 |
| 10,843,979 B2 | 11/2020 | Durand et al. | |
| 2001/0047072 A1 * | 11/2001 | Sanderson | C08G 18/10 528/85 |
| 2004/0016504 A1 * | 1/2004 | Mitarai | B29C 65/76 156/247 |
| 2005/0281968 A1 * | 12/2005 | Shanholtz | C08G 18/3836 428/35.7 |

FOREIGN PATENT DOCUMENTS

| | | | |
|---|---|---|---|
| CN | 110467512 A * | 11/2019 | ......... C06B 21/0041 |
| DE | 3534972 C1 | 4/1992 | |
| DE | 4022991 C1 | 4/1992 | |
| EP | 0260419 A2 | 3/1988 | |
| EP | 1319919 A1 | 6/2003 | |
| GB | 1160236 A | 8/1969 | |
| GB | 1445056 A | 8/1976 | |
| GB | 2166391 A | 5/1986 | |
| JP | 2008169073 A | 7/2008 | |
| KR | 20120137643 A | 12/2012 | |
| WO | 8605175 A1 | 9/1986 | |
| WO | 03084900 A1 | 10/2003 | |
| WO | 2023044575 A1 | 3/2023 | |

* cited by examiner

COMBUSTIBLE CONTAINERS MANUFACTURED USING REACTIVE INJECTION MOLDING OF AZIDO POLYMERS

CROSS-REFERENCE TO RELATED APPLICATION

This application is a continuation in part application of U.S. application Ser. No. 17/449,059, filed Sep. 27, 2021, the content of which is incorporated herein by reference.

TECHNICAL FIELD

The present disclosure generally relates to combustible containers. More particularly, the present disclosure relates to small-, medium-, and large-caliber combustible cartridge cases and propellant combustible containers that are manufactured using reactive injection molding of azido polymers.

BACKGROUND

Small-, medium-, and large-caliber combustible containers are used in both direct and indirect fire applications. Some prior art examples of combustible containers include caseless ammunition that contain a round solid pellet powder charge surrounding the bullet. The lack of cases allows for reduced weight ammunition, but the exposed propellant reduces heat sensitivity, reduces the sealing of the combustion chamber, and reduces protection against air, water, lubricants, and solvents. Also, the fact that the propellant charge must provide structural properties is limiting in both its geometrical shape and in its chemical formulation, thus limiting the combustion properties of the propellant charge.

Further prior art examples of combustible containers include various numbers of cloth increment bags containing various amounts of propellant. The bags are marked and tied to one another ensuring a quick and easy way for the soldier to remove the appropriate amount of propellant to accommodate range limitations and operational requirements. The cloth bag, however, does not allow for an efficient protection with regard to the elements (water, mud, rain, snow, etc.), and for this reason the propellant may be destroyed on site. Training activities of armed forces often result in the destruction of a large quantity of such propellant, which is a potential source of pollution for ranges and training areas and thus increasingly prohibited due to environmental concerns.

Still further prior art examples of combustible containers include two distinct propellant charge modules. Each module consists of a three-piece combustible cartridge case design and a bi-directional center core ignition system. The combustible cartridge cases are manufactured using the felting process. The felting process involves the preparation of nitrocellulose fibers, the making of an aqueous slurry of the nitrocellulose fibers, the molding of the pulp, the drying of the preform, and a series of post drying steps to improve properties such as: water resistance, chemical resistance, thermal stability, abrasion, and scuffing. The felted process allows for a rigid container with good combustion properties to be obtained, but it suffers from the following limitations: (a) high manufacturing cost due to multi-steps process, (b) high reject rate associated with poor deposition of the pulp, (c) high quality control cost, and (d) safety issues associated the post drying steps and the presence of solvent and volatile organic compounds.

Accordingly, it would be desirable to provide a manufacturing process for rigid combustible propellant containers for small-, medium-, and large-caliber applications using an affordable single-step shaping process. Additionally, it would be desirable to provide a method of manufacturing rigid combustible propellant containers that are impervious to the elements, thus allowing soldiers to easily manipulate the propellant charge in an economical way.

Furthermore, other desirable features and characteristics of the various embodiments described herein will become apparent from the subsequent detailed description and the appended claims, taken in conjunction with the accompanying drawings and this background.

SUMMARY

The present disclosure provides small-, medium-, and large-caliber combustible cartridge cases and propellant combustible containers that are manufactured using reactive injection molding of azido polymers. In one exemplary embodiment, provided is an injection process for a single propellant combustible charge including the steps of: providing a quantity of azido bearing polymer; providing a quantity of curing agent; optionally providing a quantity of chemical blowing agent; optionally providing a quantity of fibers; optionally providing a quantity of additives and catalysts; and providing a mold defining a male cavity, a female cavity, and an injection port. The injection process further includes mixing together the azido bearing polymer, the curing agent, the optional chemical blowing agent, the optional fibers, the optional additives and catalysts, and injecting the resulting mixture into the mold.

In another exemplary embodiment, provided is an injection process for a propellant charge system including a multitude of identical modules including the steps of: providing a quantity of azido bearing polymer; providing a quantity of curing agent; optionally providing a quantity of chemical blowing agent; optionally providing a quantity of fibers; optionally providing a quantity of additives and catalysts; and providing an injection mold defining a male cavity, a female cavity, and an injection port. The injection process further includes mixing together the azido bearing polymer, the curing agent, the optional chemical blowing agent, the optional fibers, the optional additives and catalysts, and injecting the resulting mixture into the mold.

In another exemplary embodiment, provided is an injection process for a propellant charge system including a multitude of non-identical modules including the steps of: providing a quantity of azido bearing polymer; providing a quantity of curing agent; optionally providing a quantity of chemical blowing agent; optionally providing a quantity of fibers; optionally providing a quantity of additives and catalyst; and providing an injection mold defining a male cavity, a female cavity, and an injection port. The injection process further includes mixing together the azido bearing polymer, the curing agent, the optional chemical blowing agent, the optional fibers, the optional additives and catalysts, and injecting the resulting mixture into the mold.

In yet another exemplary embodiment, provided is an injection process for a combustible cartridge case including the steps of: providing a quantity of azido bearing polymer; providing a quantity of curing agent; optionally providing a quantity of chemical blowing agent; optionally providing a quantity of fibers; optionally providing a quantity of additives and catalysts; and providing an injection mold defining a male cavity, a female cavity and an injection port. The injection process further includes mixing together the azido bearing polymer, the curing agent, the optional chemical blowing agent, the optional fibers, the optional additives and catalysts, and injecting the resulting mixture into the mold.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
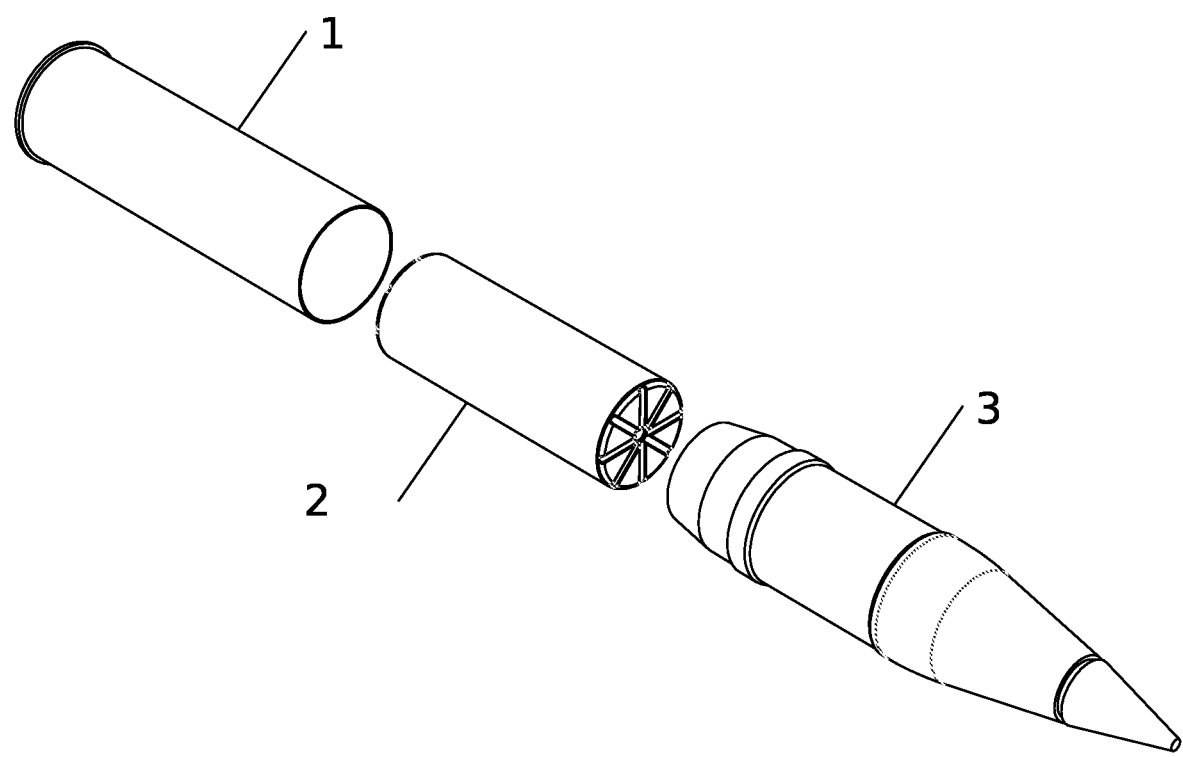
FIG. 1 illustrates an exploded view of an artillery round having a single propellant combustible charge in accordance with one embodiment of the present disclosure.
Figure 2:
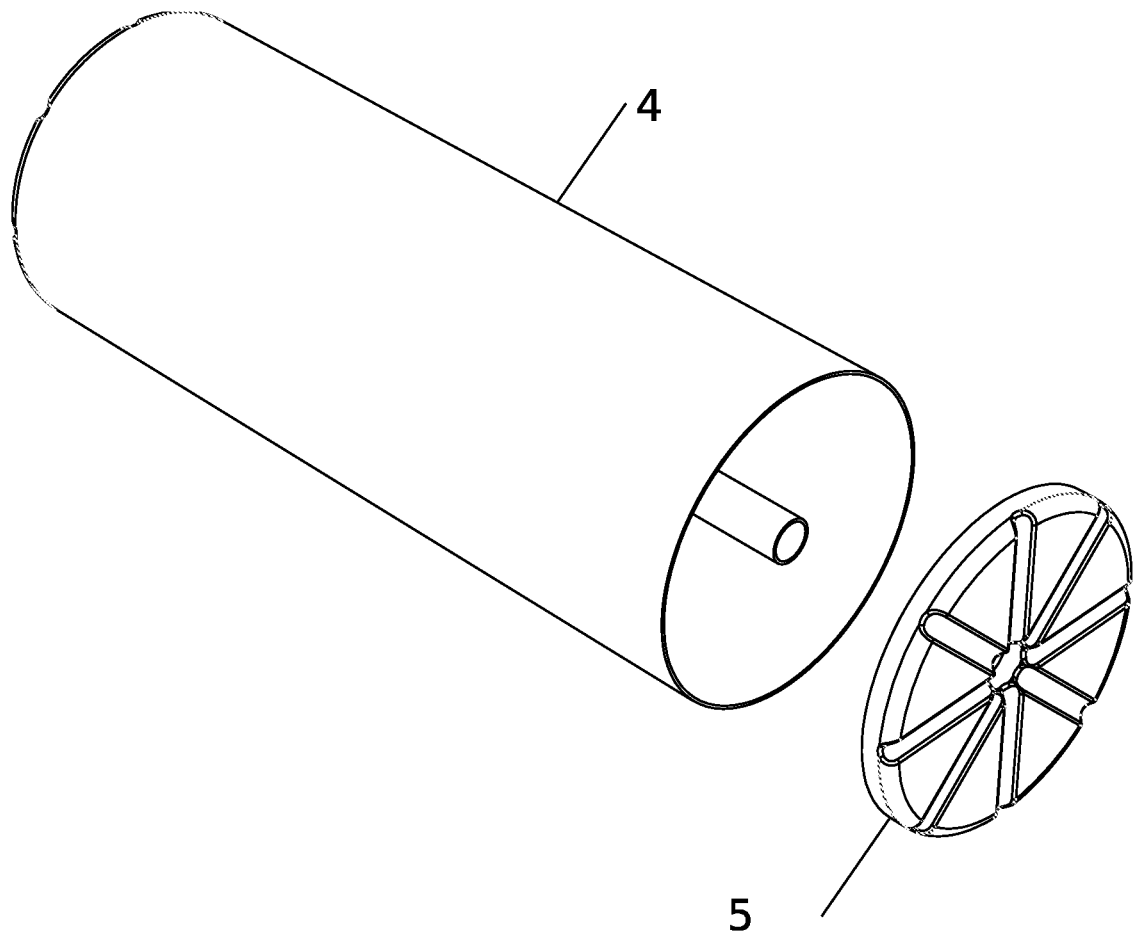
FIG. 2 illustrates an exploded view of the single propellant combustible charge in accordance with the embodiment of FIG. 1.

The following detailed description is merely exemplary in nature and is not intended to limit the various embodiments or the application and uses thereof. Furthermore, there is no intention to be bound by any theory presented in the preceding background or the following detailed description. Conventional techniques related to the compositions, methods, processes, and portions thereof set forth in the embodiments herein may not be described in detail for the sake of brevity. Various tasks and process steps described herein may be incorporated into a more comprehensive procedure or process having additional steps or functionality not described in detail herein for being well-known and readily appreciated by those of skill in the art. As such, in the interest of brevity, such conventional steps may only be mentioned briefly or will be omitted entirely without providing well-known process details.

The present disclosure is directed to the manufacturing combustible parts in the form of propellant combustible containers, combustible cartridge cases, and the like. More specifically, the present embodiments provide a method of preparing a combustible part (the "preparation method") via reaction injection molding of a curable composition.

The preparation method provides distinct advantages over prior manufacturing techniques and parts prepares, including via allowing the production of rigid propellant containers with adjustable burning properties (e.g. burn rate) and combustible cartridges having intricate geometries using a safe and cost-effective manufacturing processes. As such, the preparation method is generally illustrated herein in terms of exemplary embodiments used to prepare specific forms of combustible parts, namely, modular artillery charge containers. However, it will be appreciated that the parts may be prepared in different form (e.g. in terms of design, shape, assembly, etc.) without departing from the scope of the disclosure herein.

In addition to the preparation method and combustible parts prepared, the curable composition is also provided via description and example herein, along with specific implementations of the preparation method. In particular, in certain embodiments the preparation method is used preparing a modular charge assembly comprising multiple combustible parts in the form of rigid charge containers for us in place of conventionally fielded charge containers (e.g. cloth bags, etc.) for artillery use. The assembly provides for recuperation and subsequent incorporation of discarded charges into new cartridges, allowing for significant economic and environmental savings associated with waste, site decontamination, etc.

General embodiments of the combustible parts are provided below and illustrated in FIGS. 1-6, in the form of the modular charge assembly. The modular charge assembly as shown relates to the particular form of an M67 artillery charge, the general specifications of which are known in the art and omitted here for brevity.

Turning specifically to the figures, the arrangement in FIG. 1 illustrates a case and primer assembly (1), a propellant charge assembly that includes a single combustible case (2), and a projectile and fuse assembly (3). With additional reference now to FIG. 2, the propellant charge assembly (2) may be assembled from a top part (4) and a bottom part (5).

The top part (4) and the bottom part (5) are manufactured via the preparation method by providing a quantity of a curable composition (described in further detail below), a mixing vessel, an injection apparatus, and a temperature controlled mold defining a male cavity and a female cavity shaped in accordance with the top part (4) and the bottom part (5). The manufacturing process for the top part (4) and the bottom part (5) generally includes formulating the curable composition (e.g. by mixing together components thereof) in the mixing vessel until a thoroughly homogenized mixture is obtained. The manufacturing process thereafter includes transferring the homogenized mixture into the injection apparatus, connecting the injection apparatus to a cavity injection port of the temperature controlled mold, injecting the homogenized mixture into the cavity through the injection port, and curing or otherwise allowing the homogenized mixture to cure.

The assembly of the top part (4) and bottom part (5) to provide the propellant charge assembly that includes the single combustible case (2) may be performed by mixing a small quantity of the homogenized mixture and applying it at the joint between the top part (4) and bottom part (5) after a propellant is added to the top part (4).

Figure 3:
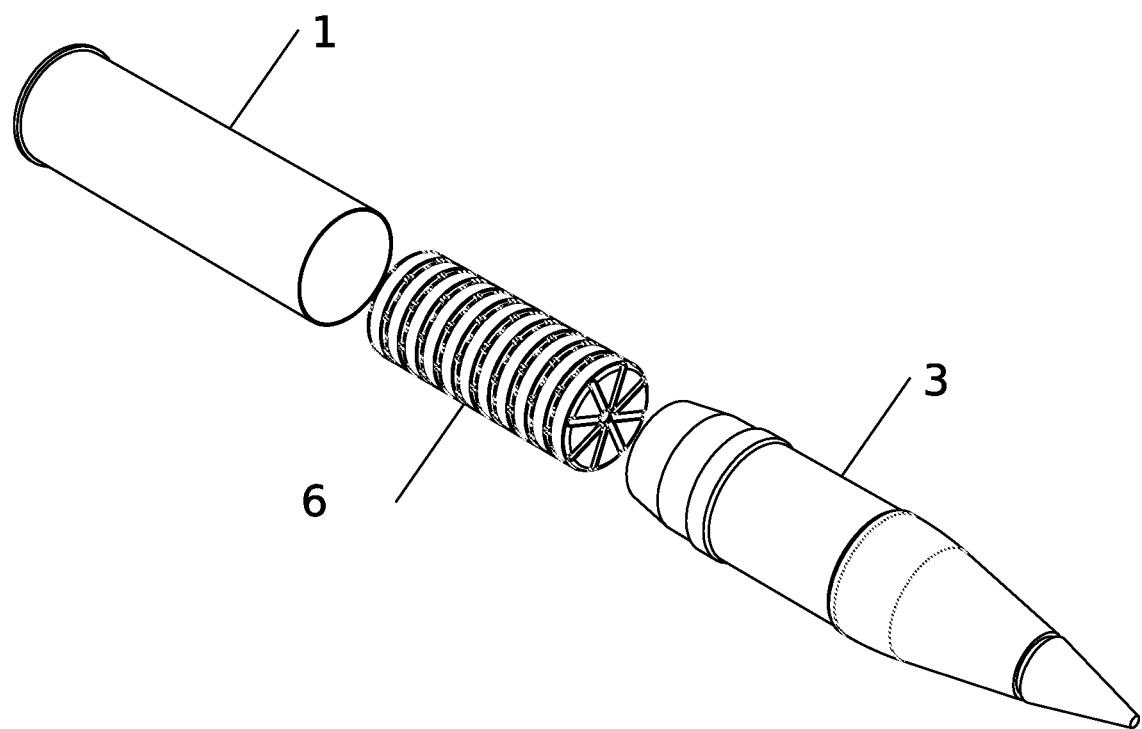
FIG. 3 illustrates an exploded view of an artillery round having multiple identical propellant combustible charge modules in accordance with one embodiment of the present disclosure.

Turning now to FIG. 3, another exemplary embodiment of the present disclosure is provided including the primer assembly (1), a modular propellant charge assembly (6) that includes multiple combustible case modules, and the projectile and fuse assembly (3). The combustible case modules of the modular propellant charge (6) are identical, e.g. with each comprising propellant in a rigid combustible container. The combustible container is shown more specifically in FIG. 4 as an assembly of a bottom part (7) and a top part (8).

In operation, each of the rigid containers (i.e., combustible case modules) in the modular propellant charge assembly (6) typically contains the same weight of propellant and may be marked/labeled with a specific firing Zone or other information to aid in the selection of how many of the rigid containers should be used in the modular charge assembly (6) for a given application. It is to be appreciated that the modular charge assembly (6) may consist essentially of the combustible case modules, or may include additional components or features to aid in the use thereof. For example, while not shown, in some embodiments the modular charge assembly (6) is wrapped in a packaging (e.g. a combustible packaging, or a disposable packaging, depending on intended use case), which packaging can be marked to show M67 Zone subdivisions explicitly, provided with marks and/or weak points designed to assist in breaking up the charge assembly at the correct points for particular Zone application (e.g. by indication how many of the combustible case modules are needed), etc. In this fashion, a user can set aside unused combustible case modules, e.g. for later inspection, reuse in new charge assemblies, etc. To this end, the combustible case modules may be serialized or otherwise marked for tracking purposes, e.g. to ensure a limited number of recycling events, to place a case module at a different end/zone of the assembly compared to a prior use, etc.

With regard to the combustible case modules, the bottom part (7) and the top part (8) are manufactured via the preparation method as described with respect to the single combustible case (2) above. Specifically, a quantity of the curable composition (described in further detail below) is prepared a mixing vessel, transferred to an injection apparatus, and injected into a temperature controlled mold defining a male cavity and a female cavity shaped in accordance with the parts (7, 8).

Other implementations of the propellant charge assembly are also provided. Turning now to FIG. 5, a specific exemplary embodiment of the present disclosure is provided including the case and primer assembly (1), a propellant charge assembly that includes multiple non-identical combustible case modules (9), and the projectile and fuse assembly (3). With continued reference to FIG. 5 and further reference back to FIG. 2 and FIG. 4, it will be understood that the propellant charge assembly (9) is prepared using multiple non-identical combustible case modules. The non-identical modules are manufactured in the same manner as previously described, with the proviso that different mold geometries are used for each non-identical module.

Figure 5:
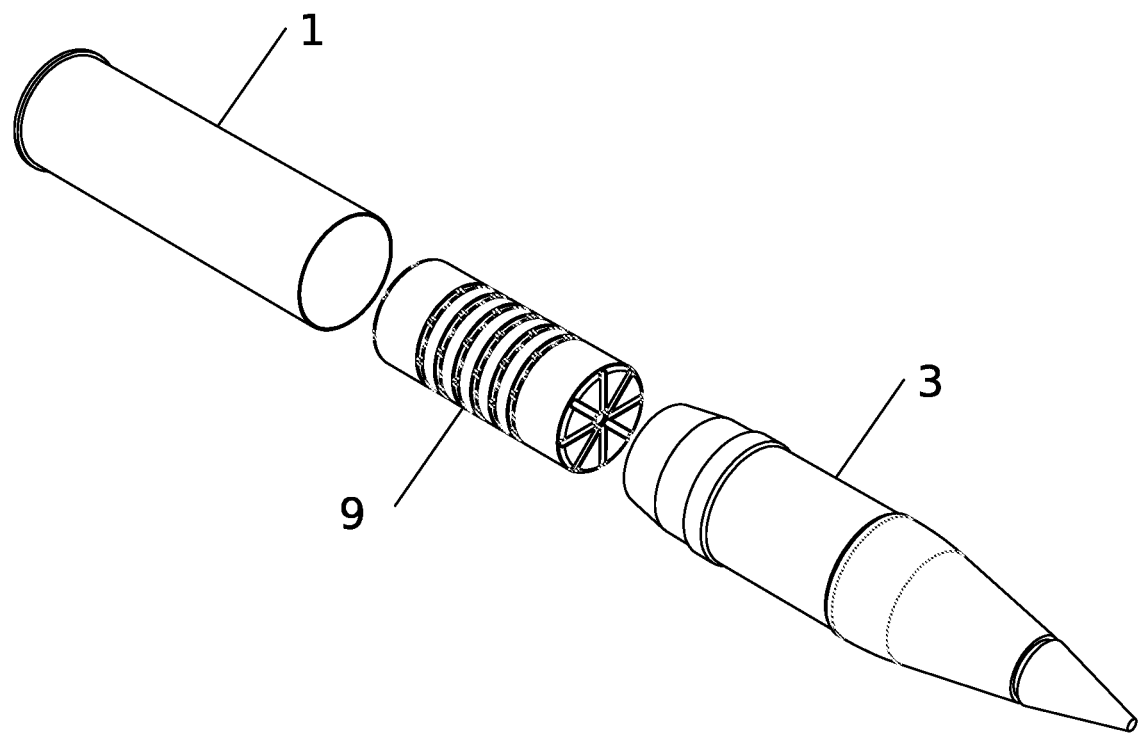
FIG. 5 illustrates an exploded view of an artillery round having multiple non-identical propellant combustible charge modules in accordance with one embodiment of the present disclosure.
Figure 6:
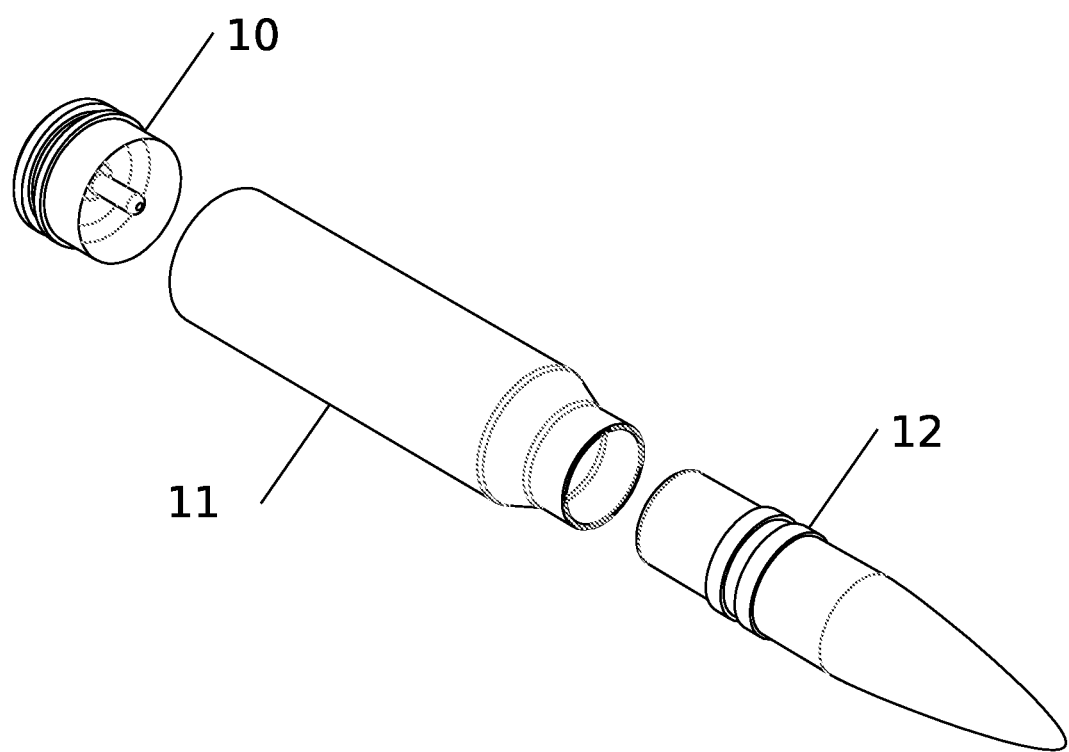
FIG. 6 illustrates an exploded view of a medium-caliber round having an injected azido polymer combustible casing in accordance with one embodiment of the present disclosure.

Turning now to FIG. 6, another exemplary embodiment of the present disclosure is provided with a snub case and primer assembly (10), a combustible cartridge case (11), and a projectile (12). In this embodiment, like those illustrated in FIGS. 1-5, each of the combustible components is prepared via the preparation method as described above, using the components and parameters set forth below. The assembly of the ammunition may be performed by mixing a small quantity of the curable composition (e.g. in the form of the homogeneous mixture) and applying it at the joint between the snub case and primer assembly (10) and combustible cartridge case (11). Once a propellant is added to the combustible cartridge case (11), a small quantity of the homogenized mixture may then be applied at the joint between the combustible cartridge case (11), and the projectile (12) then seated in place.

As introduced above, the propellant combustible containers and combustible cartridge cases prepared via injection molding using an azido polymer and a curing agent, and optionally a foaming agent and/or one or more reinforcing fillers. It will be understood that the combination of such components prepares a curable composition, which is typically prepared in situ and used quickly in the molding process (i.e., injected into the mold) prior to substantially curing. Accordingly, the process conditions are typically selected to achieve the desired physical properties of the molded article(s) (i.e., combustible parts) being prepared in the mold, and thus the ratios of components, the reaction rates thereof, the dwell time of the curable composition, and the particular selection of the components themselves may be selected in view of each or any other in order to prepare the combustible containers and combustible cartridge cases. It is also to be understood that the reaction injection molding process of the present embodiments is not interchangeable with conventional injection molding using slow-curing compositions, nor those processes preparing non-combustible parts of other materials. Moreover, as demonstrated in the examples, even similar curable compositions prepared by other methods do not provide the performance of the present embodiments, e.g. in terms of combustibility under operating conditions post-assembly.

With regard to the desired physical properties of the combustible parts being prepared, it has been discovered that material composition and material form each impact the moldability and burn rates of the molded article. More specifically, in accordance with the present embodiments, it has been discovered that selecting components to prepare thermoset materials has distinct advantages over the conventional use of thermoplastic materials. Moreover, the process conditions allow for use of such thermosets, in combination with specific additives discovered to enhance desirable features of the molded articles, to achieve consistent molding and improved burn rates of the resulting combustible parts. The particular components and parameters of the curable composition are set forth below and will be further understood in view of the examples provided herein.

In general, the process utilizes a curable thermoset composition, i.e., the curable composition prepares a thermoset material on cure. While the foaming agent is optional as a discreet component formulated into the curable composition, the curable composition is formulated to prepare a foam on cure. As such, in specific embodiments, the process utilizes a foaming curable thermoset composition, e.g. to prepare the combustible part a foam thermoset. In general, the process is typically free from thermoplastic compositions, e.g. foam thermoplastic compositions, such that the combustible parts are themselves free from thermoplastic material (e.g. foam thermoplastic).

The curable thermoset composition comprises the azido polymer and the curing agent, and optionally the foaming agent and/or one or more reinforcing fillers. In specific embodiments, the curable thermoset composition is further defined as the foaming curable thermoset composition, and comprises the azido polymer the curing agent, the foaming agent, and optionally one or more reinforcing fillers. In all such embodiment, a catalyst may be employed (e.g. to facilitate curing, foaming, etc.).

In particular embodiments, the curable thermoset composition comprises the azido polymer, the curing agent, the foaming agent, and a foam stabilizer. In such embodiment, the one or more reinforcing filler may also be utilized. Alternately, the foam stabilized may itself be a reinforcing filler. In these embodiments, the process also employs the catalyst, e.g. to facilitate curing of the curable thermoset composition.

The azido polymer (i.e., an azido-group bearing polymer) is exemplified by glycidyl azide polymers (GAP). In general, the azido polymer comprises a hydroxyl-terminated GAP. In some such embodiments, the hydroxyl-terminated GAP has a weight average molecular weight (Mw) of from about 4500 to about 6500 Daltons (Da), alternatively from about 5000 to about 6000 Da. In particular embodiments, the hydroxyl-terminated GAP has hydroxyl functionality of from about 2 to about 3, alternatively from about 2.5 to about 3, alternatively of about 2.7, per molecule. Typically, the hydroxyl-terminated GAP exhibits a viscosity (at 25° C.) of from about 10,000 to about 15,000 cps, such as from about 10,000 to about 14,000, alternatively from about 11,000 to about 13,000, alternatively of about 12,000 cps.

In some embodiments, the azido polymer comprises a low-Mw GAP, e.g. in additional to the hydroxyl-terminated GAP. In such embodiment, the low-Mw GAP typically has a Mw of less than about 2000, alternatively less than about 1500 Da, alternatively less than about 1000 Da. In specific embodiments, the low-Mw GAP has a Mw of from about 500 to about 2000, alternatively from about 500 to about 1500, alternatively from about 500 to about 1000, alternatively from about 600 to about 800 Da. In general, the low-Mw GAP is selected from non-isocyanate reactive GAP (i.e., being free from isocyanate reactive groups), and is used in proportion to the hydroxyl-terminated GAP in the azido polymer to alter the physical properties (e.g. viscosity) of the curable composition. In some embodiments, the low-Mw GAP exhibits a viscosity (at 25° C.) of less than about 500, alternatively less than about 250, alternatively less than about 200 cps. In some such embodiments, the low-Mw GAP exhibits a viscosity (at 25° C.) of from about 100 to about 200 cps.

The curing agent comprises groups reactive with the azido groups of the azido polymer, which reactive groups are exemplified by propargyl groups. As such, the curing agent itself is exemplified by propargyl bearing compounds such as propargyl esters, propargyl ethers, etc. Specific examples of such propargyl bearing compounds include propargyl polyesters or polyethers. For example, in some embodiments, the curing agent comprises a bis(propargyl) diester, such as bis(propargyl)succinate (BPS), bis(propargyl)malonate (BPM), or combinations thereof. In specific embodiments, the curing agent is selected to impart longevity to the combustible part prepared, i.e., to minimize discoloration or other visible signs of aging or degradation over time. To this end, in specific embodiments, the curing agent is substantially free from polyacrylates (e.g. hexanediol diacrylate, pentaerythritol triacrylate, etc.). In particular embodiment, the curing agent consists essentially of BPS, BPM, or a combination thereof.

The ratio of azido polymer to curing agent is typically selected at from about 10 to about 40 g curing agent for every 100 g of azido polymer, such as from about 15 to about 35 g of curing agent per 100 g of azido polymer.

Typically, the curable composition comprises a foaming agent. The foaming agent is generally selected from chemical blowing agents, physical blowing agents, and combinations thereof, and can be varied to tailor final foam density, foam rise profile, as foam cell size, etc. In specific embodiments, the foaming agent is selected from chemical blowing agents.

In specific embodiments, the foaming agent comprises a polyisocyanate and water, e.g. to prepare carbon dioxide in situ and foam the curing composition during the molding process. Examples of polyisocyanates have two or more isocyanate functionalities, and include conventional aliphatic, cycloaliphatic, araliphatic and aromatic isocyanates. Examples of these include diphenylmethane diisocyanates ("MDI"), polymeric diphenylmethane diisocyanates ("pMDI"), toluene diisocyanates ("TDI"), hexamethylene diisocyanates ("HDI"), dicyclohexylmethane diisocyanates ("HMDI"), isophorone diisocyanates ("IPDI"), cyclohexyl diisocyanates ("CHDI"), naphthalene diisocyanate ("NDI"), phenyl diisocyanate ("PDI"), and combinations thereof. In specific embodiments, the polyisocyanate is (hexamethylene diisocyanate (HDI). In some such embodiments, the foaming agent consists essentially of HDI and water.

The curable composition may further comprise a surfactant (or "foam stabilizer"). Examples of such foam stabilizers generally include silicone polyethers, ethylene oxide polymers, propylene oxide polymers, copolymers of ethylene oxide and propylene oxide, other non-ionic surfactants, and combinations thereof. In typical embodiments, the foam stabilizer is selected from silicone polyethers, such as polyether polydimethyl siloxane (PDMS) copolymers. Specific examples of such polyether-PDMS copolymers for foam stabilization known in the art and commercially available. Combinations of two or more foam stabilizers may also be utilized.

The curable composition may comprise a catalyst. In embodiments where the curable composition comprises the polyisocyanate and water foaming agent, a catalyst will also typically be utilized (e.g. to facilitate reaction foaming agent components). As such, the catalyst is exemplified by tin catalysts. Examples of general tin catalysts include organotin compounds, such as tin(II) salts of organic carboxylic acids, e.g. tin(II) acetate, tin(II) octoate, tin(II) ethylhexanoate and tin(II) laurate. Other examples include dialkyltin(IV) salts of organic carboxylic acids, such as dibutyltin dilaurate (DBTDL), dibutyltin diacetate (DBTDA), dibutyltin maleate and dioctyltin diacetate (DOTA). In specific embodiments, the catalyst comprises, alternatively consists essentially of, dibutyltin dilaurate (DBTDL).

In specific embodiments, the curable composition is free from fiber. In other embodiments, the curable composition comprises a quantity of fibers.

While general and various specific examples of the components of the curable composition are provided above, it is to be appreciated that the particular combination of components is not arbitrary, and the actual components selections must be made in view of each other and the particular process conditions used in the preparation method. For example, it will be understood that the selection and amount of foam stabilizer can be modified to decreases the cured foam density. In general, increasing the amount of surfactant in a curable composition decreases the density of the resulting foam, especially in slow cure systems (i.e., where the surfactant stabilizes bubbles while the network forms and cures). However, as introduced above, the low-Mw GAP also influences the density of the curable composition and, moreover, the particular selections of the various components will have varying solubilities, densities, and compatibilities with each other. Additionally, while increasing or decreasing the density of the curable composition may provide certain advantages, e.g. with respect to foaming, the same alternation may disadvantage other properties of the system such as homogeneity of the final foam thermoset, reaction rate between certain components, etc. Such selections and parameters will thus be best understood in view of the example provided herein.

The curable composition may be prepared in multiple parts, each comprising one or more of the components described herein, prior to mixing the parts together. It will be understood, however, that combinations of reactive components are not suitable for premixing and storage (i.e., one of skill in the art will understand that an organotin catalyst, diisocyanate and water cannot be premixed in a single part for later addition to the curable composition mixture).

Typically, the preparation method is performed as a semi-continuous process whereby controlled amounts of the components are contacted together, e.g. via pumping into a heated static mixer, to selectively control mixing and temperature (i.e., via heat transfer and increasing contract surface to bulk volume). In this fashion, the azido polymer and the curing agent are typically carefully metered during preparation of the curable composition. To this end, the curing agent is generally added fractionally to the azido polymer during the mixing phase.

In some embodiments, the curable composition comprises water and HDI as the foaming agent, and the azido polymer, foam stabilizer, catalyst, and water are mixed together in a first part, and the curing agent added in a second part. In such embodiments, the HDI is typically added as a third part at a later time, close to the time of injection. The order of these additions is influenced by the exothermic nature of the curing reaction between the azido polymer and the curing agent (i.e., where the addition of the second part is carefully selected to control/reduce temperature build), and the rate of the foaming reaction of HDI and water is highly temperature dependent. Accordingly, the temperature at which the mixture is held for each combination is also selectively controlled.

In general, the first part is combined and maintained (e.g. tempered) at a temperature of from about 55 to about 65, alternatively of about 60° C. That temperature is them maintained (e.g. via reactor circulation system) while the second part (i.e., the curing agent) is added to the first part incrementally over time. Then, the reaction temperature is typically decreased (e.g. to less than about 25, alternatively less than about 20° C.) and maintained while the HDI is added. The curable composition is then injected into the mold (e.g. aluminium mold with PTFE coating in the passed section(s)).

The injection parameters may vary. In general embodiments, the injection process is typically carried out using a flow rate of from about 2 to about 4 g/s, such as from about 2.5 to about 3.5 g/s, alternatively from about 3 to about 3.5 g/s.

The process may be carried out as a low-pressure process (e.g. 200-300 psi) or as a high-pressure process (e.g. 2000-3000 psi) depending on the equipment setup. In general, low-pressure systems are typically utilized. for very small and very large combustible parts, and also when the viscosity of the curable composition is very high. Comparatively, high pressure systems are typically sought for their ability to exhibit higher productivity, accuracy, and repeatability, and lower calibration needs and down time for cleaning the mixing head between shots. The Examples further below are prepared using a low-pressure process. However, it is believed that appropriate scaleup to a high-pressure process is achievable using appropriate equipment.

The mold temperature may be raised to facilitate foaming and curing, to give the combustible part as a foam thermoset. In general embodiments, the mold temperature is set to at least 50, alternatively at least 60, alternatively at least 70, alternatively at least 75° C. during and/or after injection, and maintained during the curing phase. For example, a mold temperature of from about 70 to about 85° C., such as from about 75 to about 80° C. may be utilized during injection and/or curing. After which, the mold is typically cooled or allowed to cool back to room temperature (e.g. about 25° C.), and the part removed. The curing time in the heated mold is typically from about 5 to about 15 hours, such as from 6 to 12, alternatively of about 8 hours.

Once the part is removed from the mold, shaping, trimming, or other processing steps may be performed to allow for subsequent assembly of the charge. Assembly is exemplified by the following procedure, with illustrative reference to the combustible container shown in FIG. having the bottom part (7) and the top part (8):

1) Combustible containers are laid out so that the top parts (8) sit next to the bottom parts (7);
2) A required quantity of propellant is added in each of the bottom parts (7);
3) Top parts (8) are dipped in a sealing composition (e.g. equal part glue solution (by weight) of GAP polyol and pentaerythritol triacrylate (PETA) or curing agent;
4) Top parts (8) are then seated on top of the bottom parts (7) making sure that parts have proper bonding at the seating surfaces;
5) The assembled charges are then stored in a controlled atmosphere (room temperature) so that the GAP-PETA glue can cure overnight.

The assembled charges are then utilized in preparing an artillery cartridge, e.g. for 105 mm M67 (Howitzer).

EXAMPLES

The present disclosure is now illustrated by the following non-limiting examples. It should be noted that various changes and modifications can be applied to the following examples and processes without departing from the scope of this disclosure, which is defined in the appended claims. Therefore, it should be noted that the following example should be interpreted as illustrative only and not limiting in any sense. Unless otherwise noted, all solvents, substrates, and reagents are purchased or otherwise obtained from various commercial suppliers (e.g. Sigma-Aldrich, VWR, Alfa Aesar) and utilized as received (i.e., without further purification) or as in a form used conventionally in the art.

Curing Agent Selection: Two combustible case cap samples were prepared with a GAP and a curing agent, reticulated at a ratio of 0.9 (—COO/$N_3$ or —CC/$N_3$). One curing agent was solely bis(propargyl)succinate (BPS) and the other a 50:50 mix of pentaerythritol triacrylate (PETA) and 1,6-Hexanediol diacrylate (HDDA). Both samples were cured in an oven at 65° C. for four days. Upon inspection, the cap reticulated using BPS stayed clear and transparent, with no coloration compared to the sample produced with the PETA:HDDA curing agent.

Burning Properties: Burning properties were evaluated using a 200 cc closed bomb vessel to replicate the condition in a gun at ambient temperature and zone 7 charge. 40 g of propellant was placed in the closed bomb and pieces of container were added in order to have the right ratio of propellant/container as it would be in a cartridge. Ignition was performed using pyrodex pellets (2 grams), and residues were assessed visually. The results are shown in the Table below.

TABLE 1

Combustible Material Sample Burning Performance

| Sample | Container (g) | Quickness (%) | Force (%) | Vivacity (%) | Comments |
|---|---|---|---|---|---|
| Cotton bag (reference) | 0.82 | 97.8 | 97.9 | 99.9 | Absence of residues |

TABLE 1-continued

Combustible Material Sample Burning Performance

| Sample | Container (g) | Quickness (%) | Force (%) | Vivacity (%) | Comments |
|---|---|---|---|---|---|
| GAP/PETA/HDDA 0.9 —COO/—N3 50% PETA 50% HDDA | 8.55 | 106.2 | 104.1 | 102.0 | Large amount of residues and strong ammonia smell. |
| GAP/HDDA 0.7 —COO/—N3 | 8.55 | 110.2 | 106.6 | 103.4 | Large amount of residues but less than that reticulated at 0.9 and strong ammonia smell. |
| GAP/BPS 0.9 —COO/—N3 | 8.41 | 105.3 | 103.0 | 102.2 | Large amount of residues but less than that reticulated at 0.9 and strong ammonia smell. |
| GAP/BPS 0.7 —COO/—N3 Foamed | 5.16 | 103.4 | 103.0 | 100.4 | Trace amount of residues, no ammonia smell. |

The reference used is 40 g of propellant with 0.817 cotton bag sample. The quantity was extrapolated using a cotton bag of charge 6. Only one shot was performed due to the material amounts As shown in Table 1, the "unfoamed" GAP samples all showed large amount of residues and strong ammonia smell. It was observed that by limiting the ratio of reticulating agent (BPS or HDDA/PETA), combustion properties improved. In comparison, only trace residue is observed with the foamed GAP, demonstrating that combustion was greatly improved compared to the unfoamed container.

The variation in quickness, force and vivacity is caused by the increase of combustible material in the closed bomb. For both the foamed sample and the cotton the variation in negligible, but for other GAP samples a large increase in the force can be registered, demonstrating the compatibility of the foamed GAP comparatively.

Preparation Example 1: In a jacketed stainless steel mixing chamber, 100.0 g of glycidyl azide polymer having a hydroxyl value of less than 1.9, 2.5 g of TEGOSTAB® B 8462, 0.6 g of water and 0.3 g of dibutyltin dilaurate as a catalyst are mixed until thoroughly homogenized. The jacketed stainless steel mixing chamber temperature profile is adjusted every 30 minutes to ensure safe processing and avoid exothermic reaction. During the mixing, 70.0 g of bis(propargyl)succinate are added in equal increments for 180 minutes. 3.1 g of hexamethylene diisocyanate are then added.

Figure 4:
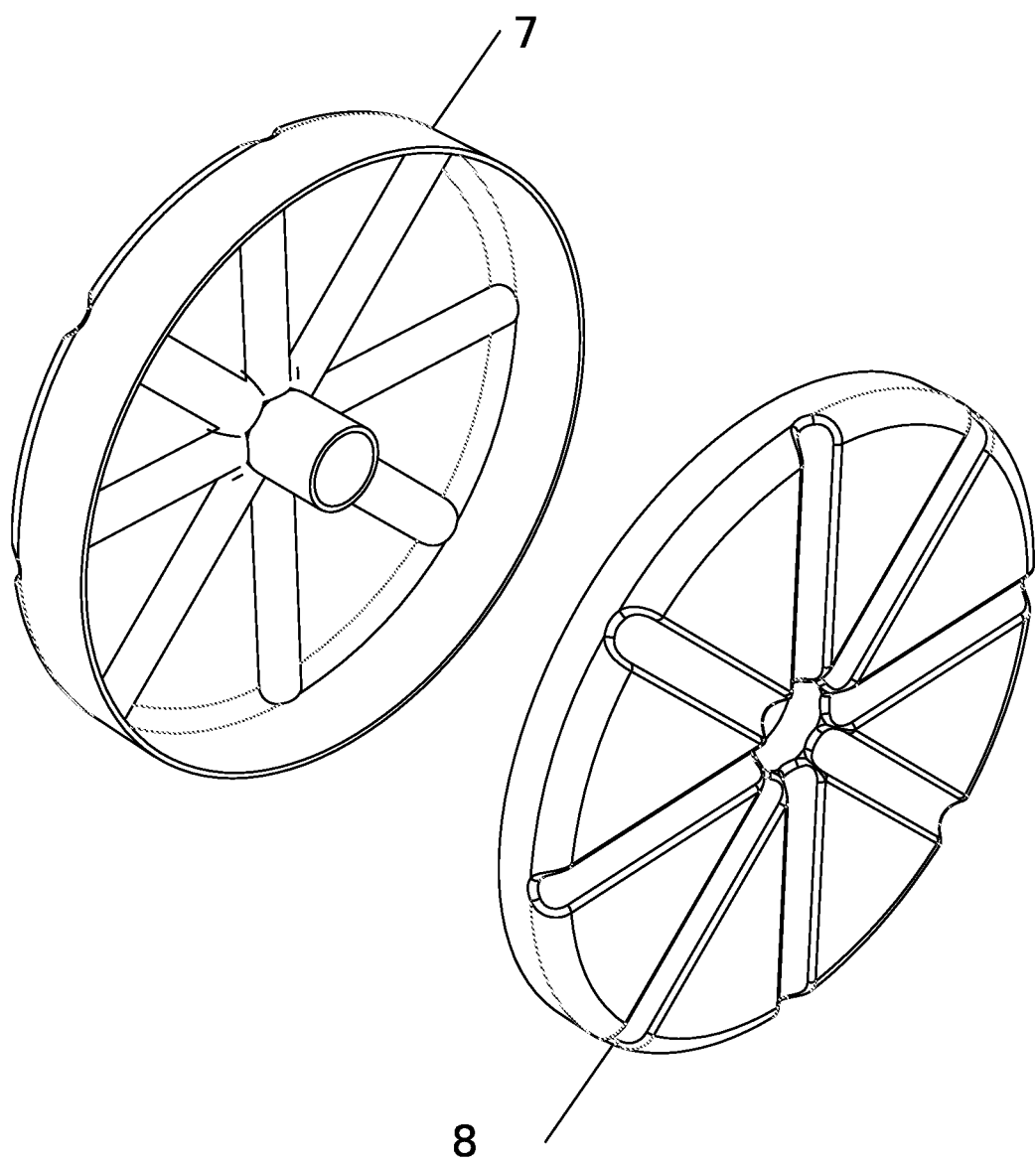
FIG. 4 illustrates an exploded view of a single propellant combustible charge module in accordance with the embodiment of FIG. 3.

The mixture is transferred in an injection device, the device is attached to the injection port of a mold to form the bottom part (7) of combustible charge module (6) as depicted in FIG. 4. A portion of the mixture is injected in the mold. The injection device is then attached to the injection port of the mold to form the top part (8) of combustible charge module (6) as depicted in FIG. 4. Using a circulatory heater, heat-transfer fluid is flowed in the double wall of the mold to cure the mixture. The temperature of the heat-transfer fluid is 77° C. The mixture is allowed to cure overnight obtaining a rigid bottom part (7) and top part (8). The bottom part (7) and the top part (8) are trimmed to remove excess material. The bottom part (7) is filled with a propellant. A quantity of the mixture is then added to the outside edge of the top part (8). The top part top part (8) is placed so that an efficient seal is obtained encasing the propellant in the rigid combustible charge module (6). Multiple charge modules (6) are then fitted inside the case and primer assembly (1). The projectile and fuse assembly (3) is then seated on the case and primer assembly (1).

Preparation Example 2: In a jacketed stainless steel mixing chamber, 8.0 g of glycidyl azide polymer having a hydroxyl value of less than 1.9, 2.0 g of glycidyl azide polymer having a hydroxyl value of more than 2, 0.15 g of TEGOSTAB® B 8513, 0.06 g of water as a foaming agent and 0.003 g of dibutyltin dilaurate as a catalyst in solution are mixed until thoroughly homogenized. The jacketed stainless steel mixing chamber temperature profile is adjusted every 30 minutes to ensure safe processing and avoid exothermic reaction. During the mixing, 5.5 g of bis(propargyl)malonate are added in equal increment for 180 minutes. 0.4 g of hexamethylene diisocyanate is then added.

The mixture is transferred in an injection device, the device is attached to the injection port of a mold to form the bottom part (7) of combustible charge module (6) as depicted in FIG. 4. A portion of the mixture is injected in the mold. The injection device is then attached to the injection port of a mold to form the top part (8) of combustible charge module (6) as depicted in FIG. 4. Using a circulatory heater, heat-transfer fluid is flowed in the double wall of the mold to cure the mixture. The temperature of the heat-transfer fluid is 77° C. The mixture is allowed to cure overnight obtaining a rigid bottom part (7) and top part (8). The bottom part (7) and the top part (8) are trimmed to remove excess material. The bottom part (7) is filled with a propellant. A quantity of the mixture is then added to the outside edge of the top part (8). The top part top part (8) is placed so that an efficient seal is obtained encasing the propellant in the rigid combustible charge module (6). Multiple charge modules (6) are then fitted inside the case and primer assembly (1). The projectile and fuse assembly (3) is then seated on the case and primer assembly (1).

Examples 3-5 and Comparative Example 1: Four curable compositions were prepared according to the procedures above, using the components and parameters shown in Table 2 below.

TABLE 2

Components and Parameters of Examples 3-5 and Comparative Example 1

| Component | Example 3 | Example 4 | Example 5 | Comparative Example 1 |
|---|---|---|---|---|
| Azido Polymer 1 (g): | 60.00 | 65.00 | 57.50 | 100.00 |
| Azido Polymer 2 (g): | 20.00 | 21.67 | 19.17 | — |
| Curing Agent 1 (g): | 40.00 | 43.33 | 38.33 | — |
| Curing Agent 2 (g): | — | — | — | 70.000 |
| Catalyst (mL): | 1.760 | 1.907 | 1.687 | 0.40 |
| Water (g): | 1.040 | 1.300 | 1.150 | 0.80 |
| Foam Stabilizer 1 (g): | 0.80 | 0.87 | 0.77 | — |
| Foam Stabilizer 2 (g): | 0.00 | 0.00 | 0.00 | 2.75 |
| Foaming Agent 1 (g): | 3.6 | 3.9 | 3.45 | 4.47 |
| Foaming Agent 2 (g): | 1.20 | 1.30 | 1.15 | — |
| Total Mass (g): | 120 | 130 | 115 | |

Azido Polymer 1 is a hydroxyl-terminated GAP having a Mw of 5500 and a hydroxyl functionality of about 2.7 per molecule, and a viscosity (25° C.) of 12000 cps (25° C.).

Azido Polymer 2 is a low-Mw GAP having a Mw of 700 and a viscosity (25° C.) of 140 cps.

Curing Agent 1 is bis(propargyl)malonate (BPM).

Curing Agent 2 is bis(propargyl)succinate (BPS).

Catalyst is a 0.1 M solution of dibutyltin dilaurate (DBTDL)

Foam Stabilizer 1 is a non-hydrolysable polyether polydimethylsiloxane copolymer stabilizer.

Foam Stabilizer 2 is a polyether silicone copolymer (EO-PMDS) surfactant.

Foaming Agent 1 is a hexamethylene diisocyanate (HDI).

Foaming Agent 2 is a solvent-free, aliphatic polyisocyanate resin based on hexamethylene diisocyanate (HDI) (HDI biuret; available commercially as N-100).

The polymerizations of Examples 3-5 were generally carried out for 3.5 hr at 52° C. before the temperature was lowered to 20° C. and the Foaming Agent added. The polymerization of Comparative Example 1 was carried out for 3.5 hr at 60° C. before the temperature was lowered to 20° C. and the Foaming Agent added.

Once the Foaming agent was added, each of the four curable compositions was reaction injected molded into a modular charge case assembly (e.g. in the form of the two-part container shown in FIG. 4), processed, and assembled into M67 propellent charge modules according to the procedures above. The resulting parts of Example 5 and Comparative Example 1 were visually assessed and test fired (105 mm M67) with the results shown in Table 3 below.

TABLE 3

Assessment of Example 5 and Comparative Example 1

|  | Example 5 | Comparative Example 1 |
|---|---|---|
| Weight per Container (g): | 13 | 14 |
| Density (g/mL): | 1.14 | 1.25 |
| Foam Structure: | FINE AND EVEN | COARSE & COALESCED |
| Residual in Gun: | NO | Yes |

Visual inspection of the combustible part of Example 5 showed homogeneous foam with a consistent fine structure, whereas the combustible part of Comparative Example 1 returned a course structure with coalesced pores.

Gun testing resulted in complete combustion of the propellent charge module prepared from Example 4, with the homogeneous structure demonstrating superior burn performance. Macroscopic observation of residues allowed confirmed the effect of foaming on improving combustion properties by allowing more surface to be in contact with the hot gas in the gun tube. Large hole are most likely already present and are produced when air is trapped in the syringe prior to injection of the containers, and smaller holes produced by the production of $CO_2$ during foaming process. Overall size seems to increase after combustion indicating that foaming will help proper combustion of the containers.

Notably, an important characteristic in the design of 105 mm artillery charges is the ability to limit the pressures at the maximum zone without observing unburned residues at the lower zones. Residues have been an ongoing issue in many programs, with no common working solution. In at least one case, low zone residues were eliminated by altering the zone 1 propellant only, as it was not required to design a modular charge. However, in the present examples, the firings at ambient conditions produced no residues at all tested zones (including the optional zone 1), while also maintaining pressures below the threshold value.

In the non-limiting examples provided above, the variation in processing conditions allows for control over properties at the mixing and injection steps as well as control over the mechanical, burning behavior, and overall energetic contribution of the finished part.

Accordingly, the present disclosure has provided various embodiments directed to the manufacturing of propellant combustible containers and combustible cartridge cases using reaction injection molding of azido polymers. The described embodiments beneficially provide a manufacturing process for rigid combustible propellant containers for small-, medium-, and large-caliber applications using an affordable single-step shaping process. Furthermore, the described embodiments provide a method of manufacturing rigid combustible propellant containers that are impervious to the elements, thus allowing soldiers to easily manipulate the propellant charge in an economical way.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims. Moreover, all combinations of the aforementioned components, compositions, method steps, formulation steps, etc. are hereby expressly contemplated for use herein in various non-limiting embodiments even if such combinations are not expressly described in the same or similar paragraphs.

With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the ranges and subranges enumerated herein sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. An individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims. Lastly, it will be understood that the term "about" with regard to any of the particular numbers and ranges described herein is used to designate values within standard error, equivalent function, efficacy, final loading, etc., as understood by those of skill in the art with relevant conventional techniques and processes for formulation and/or utilizing compounds and compositions such as those described herein. As such, the term "about" may designate a value within 10, alternatively within 5, alternatively within 1, alternatively within 0.5, alternatively within 0.1, % of the enumerated value or range.

While the present disclosure has been described with respect to particular embodiments thereof, it is apparent that numerous other forms and modifications will be obvious to those skilled in the art. The appended claims and this disclosure generally should be construed to cover all such obvious forms and modifications, which are within the true scope of the present disclosure.

What is claimed is:

1. An injection process for a combustible foam thermoset part, comprising:
   providing a quantity of an azido bearing polymer;
   providing a quantity of a propargyl bearing curing agent;
   providing a mold defining a male cavity, a female cavity, and an injection port;
   mixing together the azido bearing polymer and the propargyl bearing curing agent to form a curable thermoset composition;
   adding a foaming agent to the curable composition; and
   injecting the resulting mixture into the mold, thereby preparing a combustible foam thermoset part.

2. The injection process of claim 1, wherein: (i) the azido bearing polymer is further defined as a glycidyl azide polymer; (ii) the propargyl bearing curing agent comprises a bis (propargyl) diester; or (iii) both (i) and (ii).

3. The injection process of claim 1, wherein the propargyl bearing curing agent is selected from bis (propargyl) succinate, bis (propargyl) malonate, and combinations thereof.

4. The injection process of claim 1, wherein the azido bearing polymer comprises a glycidyl azide polymer.

5. The injection process of claim 4, wherein the glycidyl azide polymer is further defined as a hydroxyl-terminated glycidyl azide polymer having: (i) a weight average molecular weight (Mw) of from about 4500 to about 6500 Daltons (Da); (ii) a hydroxyl functionality of from about 2 to about 3, per molecule; or (iii) both (i) and (ii).

6. The injection process of claim 5, wherein the azido bearing polymer further comprises a low-Mw glycidyl azide polymer that is free from isocyanate reactive groups and has: (i) a Mw of less than about 2000 Da; (ii) a viscosity (at 25° C.) of less than about 500 cps; or (iii) both (i) and (ii).

7. The injection process of claim 1, further comprising combining the azido bearing polymer with a foam stabilizer to give a premixture, and combining the premixture with the propargyl bearing curing agent to form the curable thermoset composition.

8. The injection process of claim 7, further comprising adding water and an organotin catalyst to the premixture, wherein the foaming agent comprises a diisocyanate.

9. The injection process of claim 7, wherein: (i) the curing agent consists essentially of bis (propargyl) malonate; (ii) the foaming agent comprises a hexamethylene diisocyanate; (iii) the foam stabilizer comprises a polyether-polydimethylsiloxane copolymer; (iv) the organotin catalyst is dibutyltin dilaurate (DBTDL); or (v) a combination of any of (i)-(iv).

10. The injection process of claim 1, wherein the combustible foam thermoset part: (i) is formed to a density less than about 1.2 g/mL; (ii) has a substantially homogeneous foam density throughout its structure; or (iii) both (i) and (ii).

11. The injection process of claim 1, wherein:
   the azido bearing polymer comprises:
      a hydroxyl-terminated glycidyl azide polymer having a weight average molecular weight (Mw) of from about 4500 to about 6500 Daltons (Da) and a hydroxyl functionality of from about 2 to about 3, per molecule; and
      a low-Mw glycidyl azide polymer that is free from isocyanate reactive groups and has a Mw of less than about 2000 Da and a viscosity (at 25° C.) of less than about 500 cps;
   the propargyl bearing agent curing comprises bis (propargyl) succinate, bis (propargyl) malonate;
   the curable thermoset composition further comprises water, dibutyltin dilaurate (DBTDL), and a polyether-polydimethylsiloxane copolymer foam stabilizing agent; and
   the foaming agent comprises a hexamethylene diisocyanate.

12. The injection process of claim 11, wherein the combustible foam thermoset part: (i) is formed to a density less than about 1.2 g/mL; (ii) has a substantially homogeneous foam density throughout its structure; or (iii) both (i) and (ii).

13. The injection process of claim 1, wherein the mold defines a top part and a bottom part of the combustible part.

14. The injection process of claim 13, further comprising removing the top part and the bottom part from the mold and joining together the top part and the bottom part using a quantity of the curable thermoset composition to form the combustible part.

15. The injection process of claim 14, further comprising adding a propellant charge to the bottom part before joining the top and bottom parts together, such that the combustible part comprises the propellant charge.

16. The injection process of claim 15, wherein the combustible part is further defined as a single combustible propellant module, and wherein the method comprises preparing a plurality of combustible propellant modules to give a combustible propellant module assembly.

17. The injection process of claim 16, wherein the plurality of combustible propellant modules are each substantially the same as each other.

18. The injection process of claim 17, further comprising assembling the combustible propellant module assembly into an artillery round with a case and primer assembly and a projectile and fuse assembly.

19. A combustible part prepared according to the injection process of claim 12.

20. An artillery round prepared according to the injection process of claim 18.

\* \* \* \* \*